M. M. Sprinkle.
Corn Planter and Fertilizer.
Nº 90,698.   Patented Jun. 1, 1869.
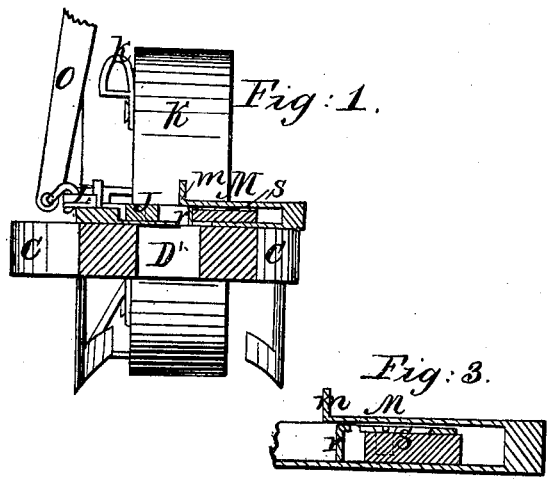
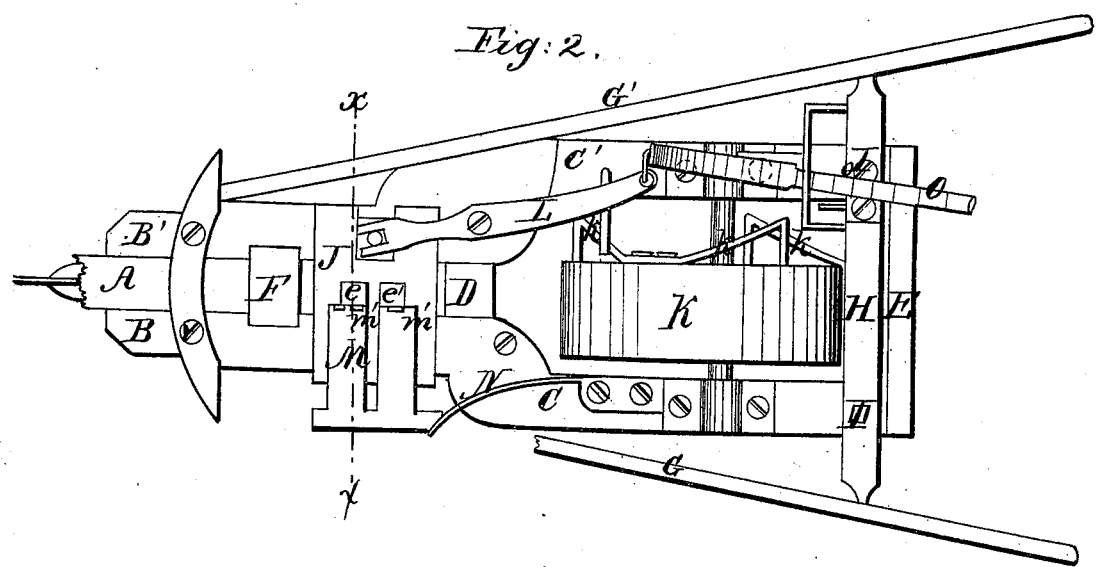
Witnesses:
C. A. Pettit
S. C. Kemon
Inventor:
M. M. Sprinkle
by Munn & Co
Attorneys

United States Patent Office.

M. M. SPRINKLE, OF ROCHELLE, VIRGINIA, ASSIGNOR TO HIMSELF AND ROBERT C. GARNETT, OF SAME PLACE.

Letters Patent No. 90,698, dated June 1, 1869.

IMPROVEMENT IN CORN-PLANTERS AND FERTILIZERS.

The Schedule referred to in these Letters Patent and making part of the same.

*To all whom it may concern:*

Be it known that I, M. M. SPRINKLE, of Rochelle, in the county of Madison, and State of Virginia, have invented a new and improved Corn-Planter; and I do hereby declare that the following is a full, clear, and exact description of the construction and operation of the same, reference being had to the accompanying drawings, making a part of this specification, in which—

Figure 1 is a vertical section through line $x\,x$ of fig. 2.

Figure 2 is a top view, the hopper having been removed.

The object of this invention is to construct the seed-distributing device in such a manner that it shall operate more perfectly than heretofore.

In the drawings—

A is the tongue;

B B', the two forward side-pieces of the frame;

C C', the two rear side-pieces of the same;

D, a cross-beam, at or near the point where the side-pieces B B' are attached to C C';

E, the rear cross-beam;

F, the plow-standard;

G G', the two handles, connected together by a round, H, and supported by standards I I;

J, the bottom of the hopper;

K, the roller, or wheel;

M, the slide which opens or closes apertures $e\,e'$, through the hopper-bottom, thereby properly distributing the seed;

L, a lever, which, striking against cams $k\,k$, on the side of wheel K, as the latter rotates, slides the plate M to the left, thereby opening the holes $e\,e'$;

N, a spring, which forces the plate back and closes the holes, as soon as the cams pass the end of the lever;

O, a hand-lever, by which the lever L can be thrown out of the way of the cams, so that they will no longer cause it to move the slide and drop the seed; and $o$, a catch by which the lever O can be fastened in the position referred to, whenever necessary, as, for instance, in going to and from the field.

The plate M is a single plate, preferably of thin metal, one part of which slides under the hopper-bottom J, the other part sliding upon said hopper-bottom, and provided with a spur, or projection of suitable form, against which the spring N can properly act.

This plate is so constructed that when slid to the left, it closes the lower end of the holes $e\,e'$, and opens their upper end, so that they become pockets to receive and hold the seed necessary for a hill. When they are thus filled, the plate slides back to the right, thereby closing the upper end of the holes, so as to prevent their receiving any more seed, and opening their lower end, so as to drop the seed already in them.

The projecting ends $m'\,m'$ of the upper part of plate M slide lightly over the holes $e\,e'$, cutting off or admitting the seed, according to the position of the plate. These ends are made thin, so that should a kernel of corn get between them and the edge of the holes, they will not cut the seed, but spring up over it, and when they slide back will push or draw it into the "pocket," thus preserving all the seed entire.

The lower part of the plate M opens and closes the bottom of the holes $e\,e'$, by means of corresponding holes in the plate itself, which at the proper time are brought under or removed from said holes $e\,e'$ by the sliding of the plate.

The size of the holes $e\,e'$ is adjusted by means of bent plates $r\,r$, fixed in any required position, by set-screws $s\,s$.

The upper part of plate M may be slotted, as at $m$, so as to pass on each side of a guide-pin, or cleat, and the two parts, if desired, can be made to operate, in connection with separate hoppers, one for the seed and the other for the fertilizer.

Having thus described my invention,

What I claim as new, and desire to secure by Letters Patent, is—

1. The slide M, constructed and operating, in connection with the part J, as and for the purposes specified.

2. In combination with slide M and bottom J, the levers L O, catch $o$, and cams $k\,k$, constructed and operating as described.

3. The adjusting-plates $r\,r$ and screws $s\,s$, in combination with the sliding plate M and bottom J, substantially as and for the purpose specified.

To the above specification of my improvement, I have set my hand, this 2d day of March, 1869.

M. M. SPRINKLE.

Witnesses:
 CHAS. A. PETTIT,
 S. C. KEMON.